Aug. 27, 1946.   J. W. HOBBS   2,406,686
METHOD OF MAKING SEALING DEVICES
Original Filed Sept. 5, 1942   2 Sheets-Sheet 1

Inventor
John W. Hobbs.
by
Attys

Aug. 27, 1946.  J. W. HOBBS  2,406,686
METHOD OF MAKING SEALING DEVICES
Original Filed Sept. 5, 1942   2 Sheets-Sheet 2
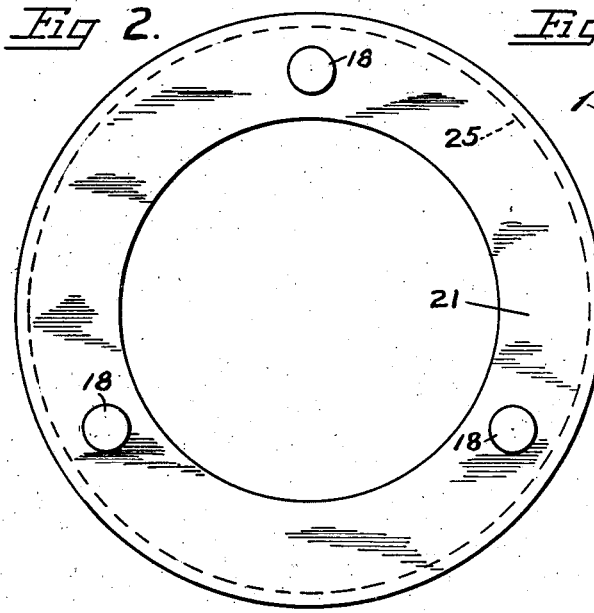
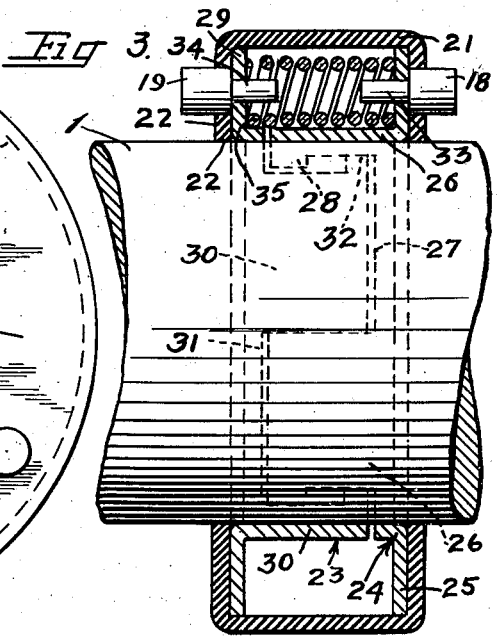
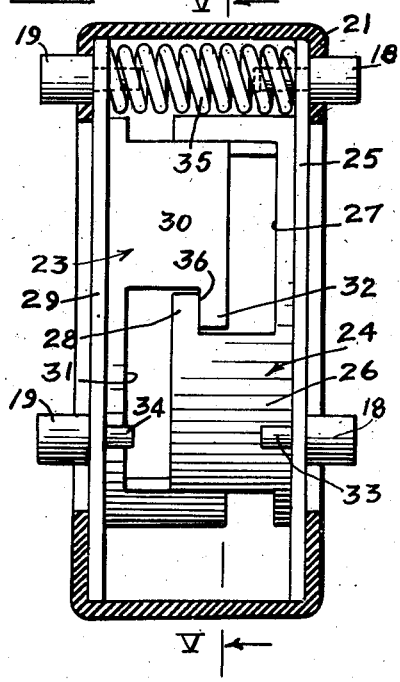
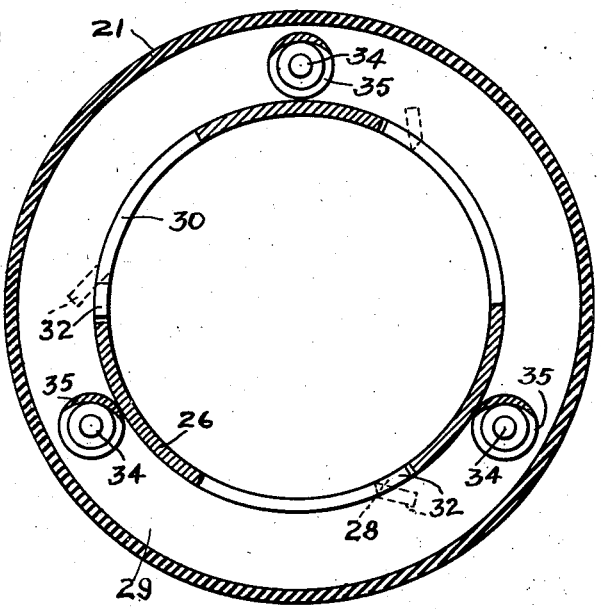
Inventor
John W. Hobbs.
by Charles Hill
Attys Patented Aug. 27, 1946

2,406,686

UNITED STATES PATENT OFFICE 2,406,686

METHOD OF MAKING SEALING DEVICES

John W. Hobbs, Springfield, Ill., assignor to John W. Hobbs Corporation, Springfield, Ill., a corporation of Illinois Original application September 5, 1942, Serial No. 457,397, now Patent No. 2,372,781, dated April 3, 1945. Divided and this application June 24, 1943, Serial No. 492,041

1 Claim. (Cl. 29—148)

This invention relates to improvements in a method of making a sealing device, and more particularly to a method of making a sealing device that is in the nature of a packing ring for disposition about a shaft to prevent the escape of lubricant from bearings associated with the shaft, although the device may have other uses and purposes as will be apparent to one skilled in the art.

This application is a division of my copending application entitled "Sealing device," filed September 5, 1942, Serial No. 457,397, now Patent No. 2,372,781.

It is an important object of this invention to provide a method of making a sealing device equipped with replaceable sealing means, the practice of the method resulting in the provision of such a sealing device which need not be taken apart in order to equip it with a new sealing means in lieu of a worn sealing means.

Another object of the invention resides in the provision of a method of making a sealing device of a character such as to be axially compressible, the method resulting in such a device which is substantially permanently assembled in position for use regardless of its axial compressibility.

A further object of the invention is the provision of an extremely simple and economical method of making a sealing device having interlocking parts eliminating any unintentional separation of the parts of the device.

A further object of the invention is the provision of a facile and economical method of making a sealing device to retain lubricant or some other liquid or semi-liquid substance in its desired location against leakage.

While some of the more salient features, characteristics and advantages of the instant invention have been above pointed out, others will become apparent from the following disclosures, taken in conjunction with the accompanying drawings, in which:

Figure 2 is an enlarged side elevational view of one of the sealing devices embodied in the structure of Figure 1;

Figure 3 is an enlarged fragmentary vertical sectional view of the sealing device of Figure 2 in position on a shaft, the shaft being shown in elevation, and parts of the sealing device being shown in elevation;

Figure 1:
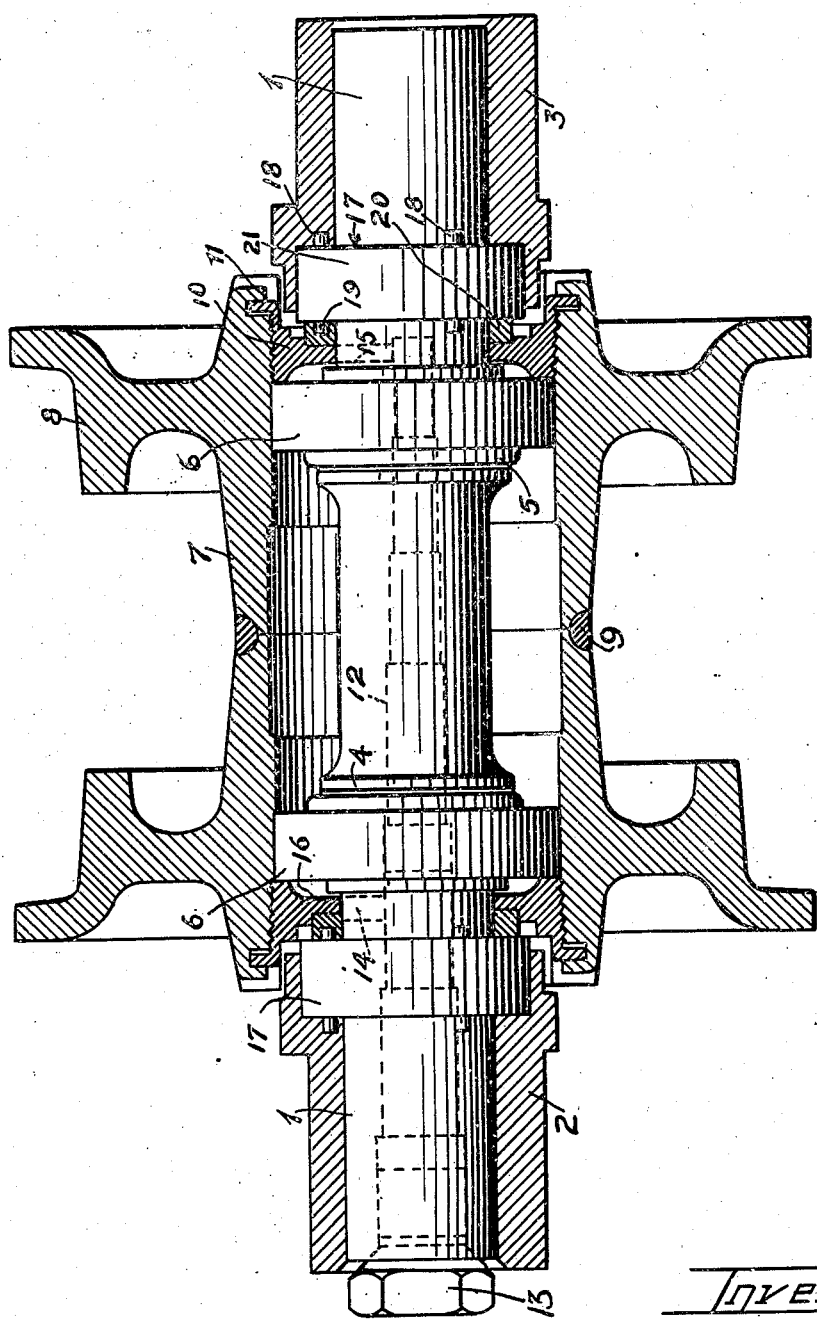
Figure 1 is a fragmentary part sectional, part elevational view of a wheel mounting for a Caterpillar tread, the mounting including sealing devices embodying principles of the instant invention.

Figure 4 is an edge elevational view of the sealing device seen in Figures 2 and 3, with the covering boot shown in section, the device being seen in its expanded condition, removed from a shaft; and Figure 5 is an enlarged transverse sectional view through the sealing device taken substantially as indicated by the line V—V of Figure 4, looking in the direction of the arrows, and indicating in dotted lines a step in my novel method of making the sealing device.

As shown on the drawings:

For purposes of clarity, I will first proceed with a description of the use and construction of the sealing device itself.

The illustrated embodiment of the instant invention is shown in association with an idler wheel mounting for a Caterpillar tread, such as may be incorporated in a tractor, tank, or the like, in Figure 1 of the drawings. This idler wheel mounting or assembly includes a stationary shaft 1 carried in a pair of end supporting bearings 2 and 3, the shaft being provided with integral flanged portions 4 and 5 spaced apart and disposed at an intermediate region of the shaft. Against each of the flanged portions 4 and 5 is a roller bearing assembly 6 which carries an idler wheel or pulley 7 equipped with suitable Caterpillar tread engaging lugs 8. The idler wheel is preferably put on in two sections which are joined together after mounting by a suitable seal 9. A suitable bearing holding collar 10 is provided on the outside of each bearing 6, and has an upstanding flange engaged by one or more holding lugs 11 struck inwardly from the pulley 7.

Since the pulley 7 rotates under heavy load on the bearings 6—6, suitable lubricant must at all times be supplied to the bearings. To this end, the shaft is provided with an interior step-down bore 12 closed at the outer end by a suitable plug 13. Lubricant may be provided under pressure to the bore 12, and passed to each of the bearings through radial channels 14 and 15 in the shaft. Each of the channels 14 and 15 communicates with the arcuate wall 16 of the adjacent collar 10 so that the lubricant under pressure may pass along this curved wall 16 and enter the roller bearing assemblies 6—6. It is naturally desirable to prevent loss of lubricant between the shaft 1 and the supporting bearings 2 and 3. To this end, a sealing device embodying improvements of the instant invention is mounted in the structure outside of each of the bearing assemblies 6—6.

Such sealing device is generally indicated by reference numeral 17, and the sealing device has a plurality of studs extending therefrom on each side. In the illustrated instance, there are three such studs 18 on one side, and a similar number of studs 19 on the opposite side. The studs 19 fit in suitable sockets in a washer 20 abutting an inwardly extending flange on the adjacent collar member 19, and the studs 18 seat in suitable recesses in the adjacent supporting bearings 2 or 3 as the case may be. When so mounted in position, the sealing device is preferably under axial compression, that is, the device is actually squeezed axially between the washer 20 and the adjacent supporting bearings 2 or 3. Such squeezing action, as will more fully later appear herein, augments the sealing function of the device, and the device is internally constructed to provide a reactive outward pressure against the axial compression.

With reference now to Figures 2, 3 and 4, it will be seen that the sealing device is in the nature of a retainer ring, and is enclosed within a boot or casing 21, preferably of resilient material, which functions as the sealing medium proper. This boot may be made of any suitable material, such, for example, as synthetic rubber, a material known as "neoprene" being a satisfactory substance.

As seen best in Figures 3 and 4, the boot is of channel shape and the sides of the channel are provided with suitable apertures through which the studs 18 and 19 extend. As seen best in Figure 3, when the sealing device is mounted in position on the shaft 1, the resilient boot 21 has what may be termed edgewise engagement with the shaft as indicated at 22 on each side of the sealing device. Such edgewise engagement, especially when the sealing device is under an axial compression, provides an exceedingly positive seal against the leakage of lubricant along the outer surface of the shaft. It will also be especially noted that such edgewise engagement provides only a minimum surface contact of the sealing medium with the shaft so that there will be extremely little wear upon the sealing medium in the event the shaft 1 rotates relatively to the sealing device.

Interiorly thereof, the sealing device comprises a pair of complemental half-portions, that is, a left half-portion and a right half-portion of similar construction. These portions are generally indicated by numeral 23 for the left half-portion and 24 for the right half-portion.

The right half-portion 24 includes a radial flange 25 extending outwardly from an integral body portion 26 which is of substantially cylindrical construction for telescopic engagement with the shaft 1. The body portion 26 is provided with a plurality of relatively large apertures 27 spaced therearound. In the illustrated instance there will be three such apertures in the body portion. One side wall of each aperture is free of obstruction and parallels the axis of the device. A lug 28 extends circumferentially on the other side wall of the aperture, as seen best in Figure 4, thus defining an open neck portion leading into the opening or aperture 27 which neck is definitely narrower than the main part of the opening.

The left-portion or member 23 is of complemental and similar construction, including a radial flange 29, a cylindrical body portion 30, a series of relatively large apertures 31 in the body portion, and a lug 32 extending circumferentially from one of the side walls of each of the apertures to provide a narrower neck portion leading axially into the aperture.

With reference to Figure 4, it will be seen that the lugs 28 on the right half-portion 24, and the lugs 32 on the left half-portion 23 overlap each other and are normally in edge to edge contact when the sealing device is not mounted in operative position. The solid body portions 30 of the left member extend into the openings 27 in the right member, and likewise the solid body portions 26 of the right member extend into the openings 31 of the left member. The lugs 28 and 32, while permitting axial movement of the side members toward each other to the depth of the openings 27 and 31, do not permit an axial separation of the members beyond the position seen in Figure 4, due to the edgewise abutment of the lugs with each other.

Each of the studs 18 on the radial flange 25 is provided with a reduced shank 33 extending through to the inside of the flange. Likewise, each of the studs 19 on the radial flange 29 on the left member is provided with a reduced shank 34 extending inwardly from that flange. With reference again to Figures 3 and 4, it will be seen that the studs 18 and 19 are directly opposite each other so that oppositely disposed shanks 33 and 34 provide a suitable mounting means for a compression spring 35. In the illustrated instance, there are three such compression springs disposed equidistantly around the sealing device. The springs 35 always tend to force the two half-portions of the device outwardly and thus separate them to the limit established by the edge to edge engagement of the lugs 28 and 32 indicated at 36 in Figure 4. It should be mentioned that in Figure 4 one of the springs 35 has been omitted from the disclosure for the purpose of clarity.

As stated above, this invention also contemplates a novel method of making the sealing device. To this end, each half portion 23 and 24 of the device may be formed in a punch press or other suitable mechanism. However, on one of these half-portions, and it may be either one, the circumferentially extending lugs forming the interlocking engagement are left in outwardly bent position. In the illustrated instance, I have selected the half 23 for this purpose, and with reference to Figure 5 it will be seen that initially the lugs 32 are left in outwardly inclined position as indicated by the dotted lines in this figure. This half-portion 23 with the outwardly inclined lugs 32 is first put on a form shaft or arbor. The springs 35 are then held in position as the other half-portion 24 is pushed on the same arbor and the respective solid body portions of both halves enter into the corresponding openings 27 and 31 in the opposite half-portion. The lugs 32 are preferably outwardly inclined just sufficiently for the lugs 28 on the half-portion 24 to pass by them. These lugs 28 are in true circumferential relationship with the remainder of the body portion 26.

When the parts are so mounted with the springs 35 in place, the parts are pressed axially toward each other sufficiently for the lugs 8 to pass the outwardly inclined lugs 32. When so positioned, the lugs 32 are then bent inwardly to the circumferential extending position in interlocking engagement with the lugs 28 on the opposite half-portion. The form shaft or arbor forms a backing for this bending operation which may be done very simply and expeditiously, and the device is then securely held together. After this forming operation, the resilient boot 21 is placed in position, over the structure, and locked in place over the protruding studs 18 and 19.

From the foregoing, it is apparent that I have provided a novel and easily practiced method of making a sealing device. It will be noted that the method is quite economical to practice, and results in the provision of a sealing device instantly ready for use. Further, it will be noted that a sealing device manufactured in accordance with the instant method is capable of having the sealing medium per se replaced when desired without the necessity of removing or separating the parts of the device, and the device effectively maintains its assembled condition against unintentional separation even though it is readily axially compressible when in use.

It will, of course, be understood that various steps of the method may be varied through a wide range without departing from the principles of this invention, and it is, therefore, not the purpose to limit the patent granted hereon otherwise than necessitated by the scope of the appended claim.

I claim as my invention:

The method of making a sealing device, including the steps of forming one of a pair of complemental substantial cylindrical members with circumferentially extending spaced lugs thereon, forming the second of said pair of members with the corresponding lugs projecting at an angle to the circumference, assembling said members in confronting relationship on an arbor with spring means therebetween, compressing said spring means by relative axial movement between said members until the circumferential lugs are behind the angular lugs, and bending the angular lugs against the arbor as an anvil into interlocking relationship with said circumferential lugs to hold said members united against the action of said spring means.

JOHN W. HOBBS.